United States Patent
Zeamer et al.

(10) Patent No.: US 9,015,989 B1
(45) Date of Patent: Apr. 28, 2015

(54) ANT BAIT DISPENSER

(71) Applicants: Paul R. Zeamer, Madison, WI (US); James R. Walsh, Wauwatosa, WI (US)

(72) Inventors: Paul R. Zeamer, Madison, WI (US); James R. Walsh, Wauwatosa, WI (US)

(73) Assignee: Bell Laboratories, Inc., Madison, WI (US)

( * ) Notice: Subject to any disclaimer, the term of this patent is extended or adjusted under 35 U.S.C. 154(b) by 0 days.

(21) Appl. No.: 14/284,591

(22) Filed: May 22, 2014

(51) Int. Cl.
*A01M 1/20* (2006.01)
*A01M 25/00* (2006.01)
*A01M 1/02* (2006.01)

(52) U.S. Cl.
CPC .............. *A01M 1/02* (2013.01); *A01M 1/2005* (2013.01)

(58) Field of Classification Search
CPC ..... A01M 1/20; A01N 43/22; A01N 2300/00; A01N 47/02; A01N 53/00
USPC .......................... 43/121, 124, 131, 132.1, 107
See application file for complete search history.

(56) References Cited

U.S. PATENT DOCUMENTS

| | | | |
|---|---|---|---|
| 2,783,084 A * | 2/1957 | Worthen .......................... 239/59 |
| 4,247,042 A | 1/1981 | Schimanski et al. |
| 4,526,320 A | 7/1985 | von Philipp et al. |
| 4,995,555 A | 2/1991 | Woodruff |
| 6,189,259 B1 | 2/2001 | Soller |
| 6,370,813 B1 | 4/2002 | Nelson et al. |
| 6,467,216 B2 | 10/2002 | McManus et al. |
| 6,553,712 B1 | 4/2003 | Majerowski et al. |
| 6,950,607 B2 * | 9/2005 | Yip et al. ....................... 392/395 |
| 6,957,779 B2 * | 10/2005 | Joshi et al. ....................... 239/43 |
| D515,175 S | 2/2006 | Mayo et al. |
| 7,204,054 B2 | 4/2007 | Mayo et al. |
| 7,614,568 B2 * | 11/2009 | Joshi et al. ......................... 239/6 |
| 8,156,684 B2 | 4/2012 | Kirkland et al. |
| 2005/0252074 A1 | 11/2005 | Duston et al. |
| 2006/0191189 A1 | 8/2006 | Mayo et al. |
| 2009/0100744 A1 | 4/2009 | Endepols |
| 2013/0219771 A1 * | 8/2013 | Black et al. ...................... 43/114 |
| 2014/0166776 A1 * | 6/2014 | Fang et al. .................. 239/102.2 |

FOREIGN PATENT DOCUMENTS

WO     9422297 A1   10/1994

OTHER PUBLICATIONS

Ant Pro Operating Instructions, <http://www.kmantpro.com/instructions_pf.html>, accessed Jun. 7, 2011.

* cited by examiner

*Primary Examiner* — Darren W Ark
*Assistant Examiner* — George Andonyan
(74) *Attorney, Agent, or Firm* — Stiennon & Stiennon

(57) ABSTRACT

An insect toxic bait dispenser has a top with multiple downwardly opening compartments in which toxic bait fluids may be retained by an underlying foil barrier. The top is supported on a base with posts positioned beneath the barrier. Base prongs extend into a top shaft with ledges at different heights, preventing part separation when the barrier is intact above the posts, and, when the top is closed on the base, piercing the foil seal and dispensing liquids into fluid retaining members held in base pockets. To use, a peripheral tear strip is removed from the base, permitting the top to descend on the base causing the posts to puncture the seal, compressing the fluid retaining members against the barrier to receive and dispense toxic bait liquid while retarding the rate of liquid evaporation. The top may be hinged to the base, or urged downwardly by a threaded cap.

20 Claims, 8 Drawing Sheets

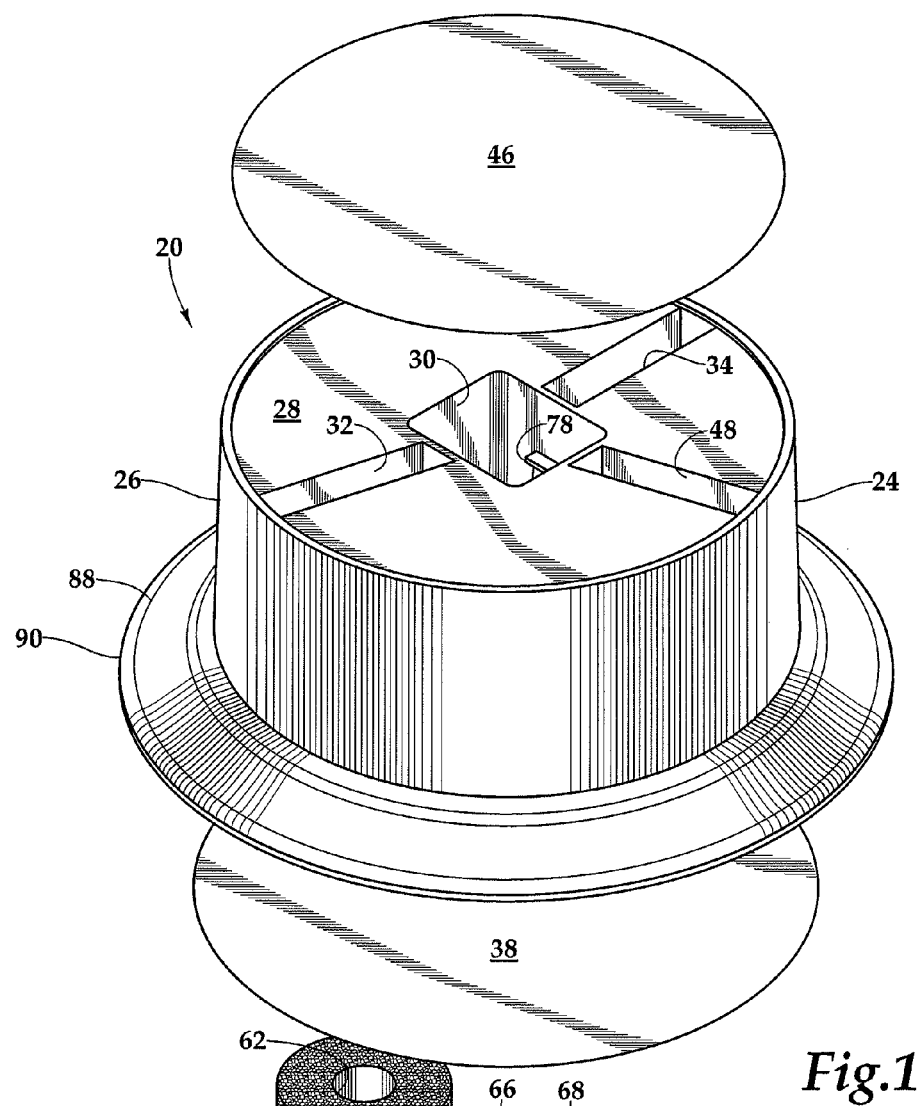
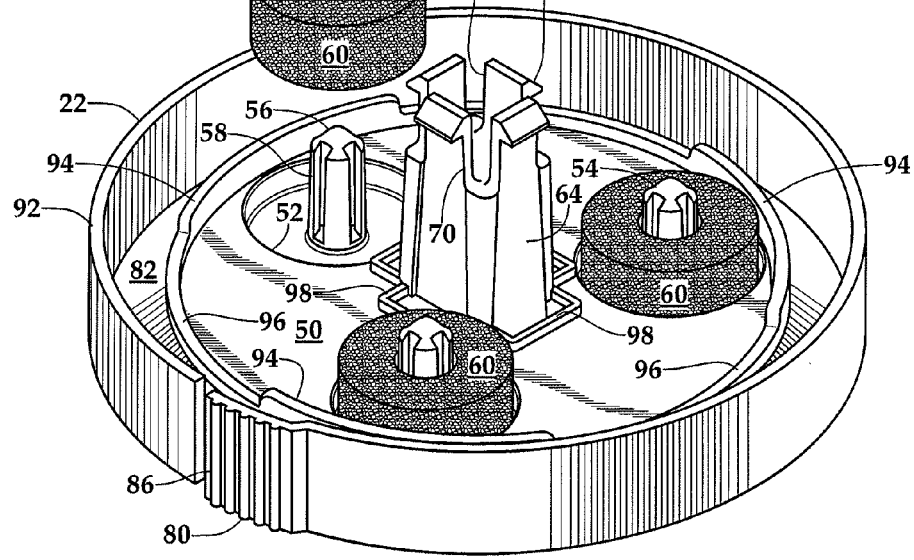
Fig.1

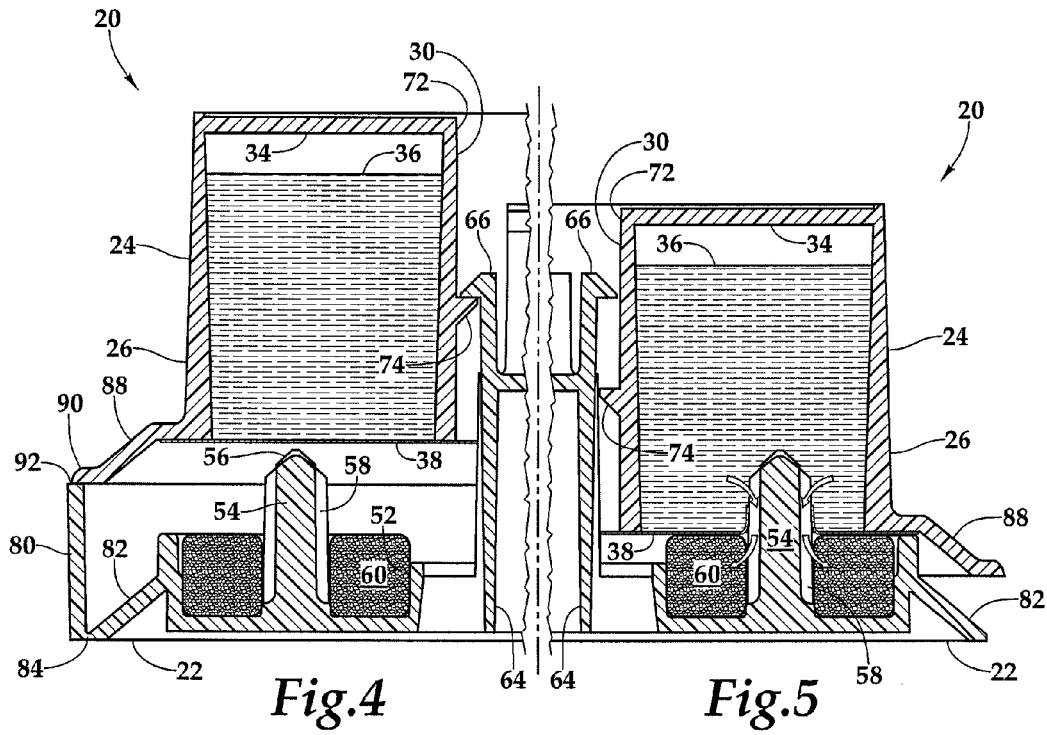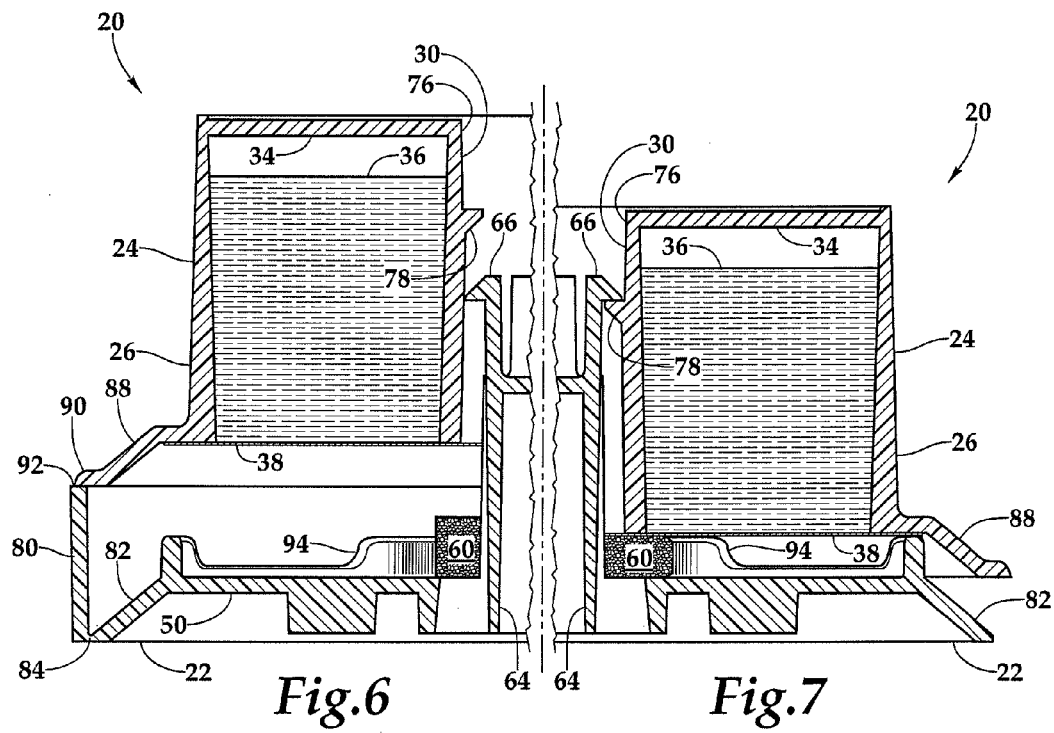

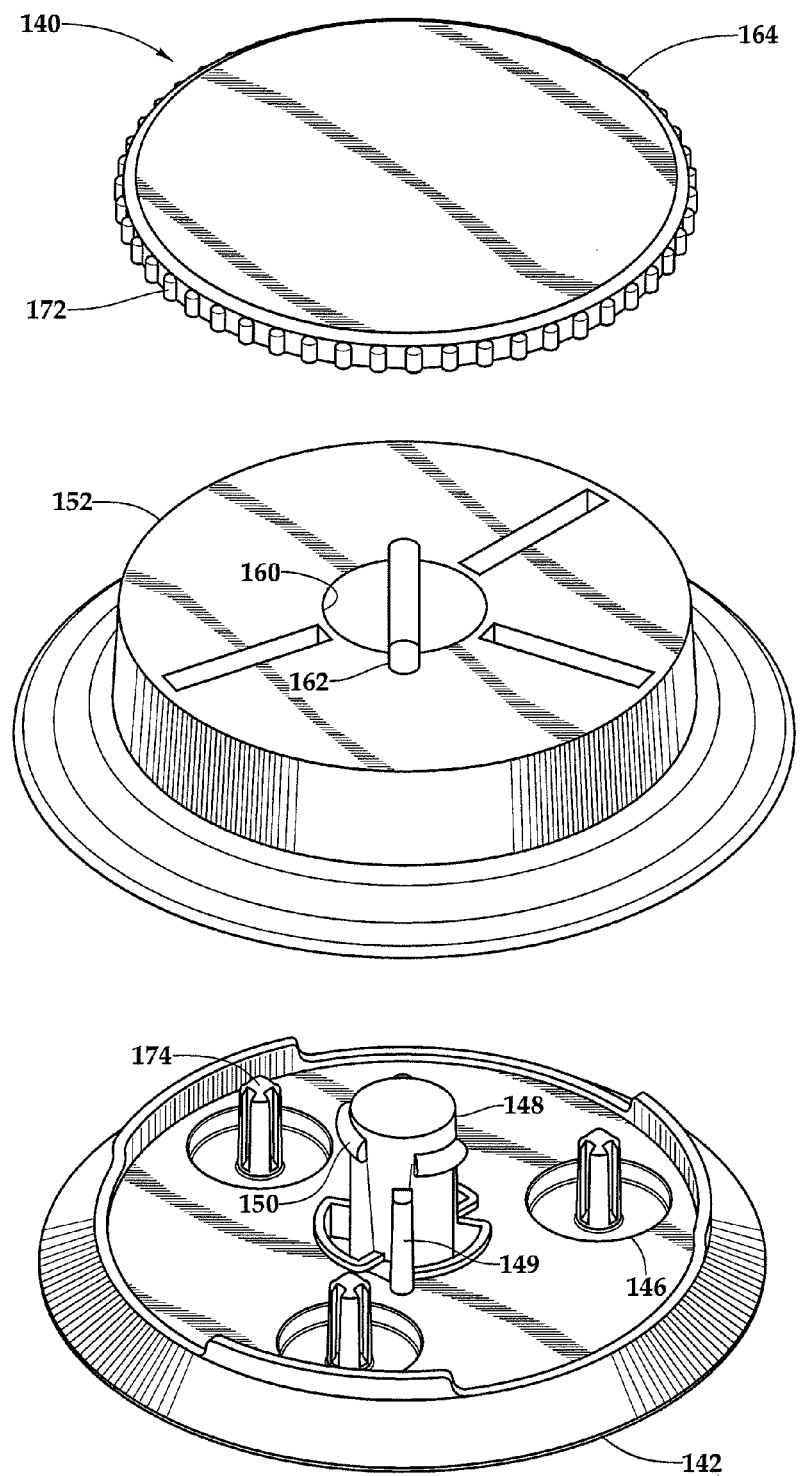

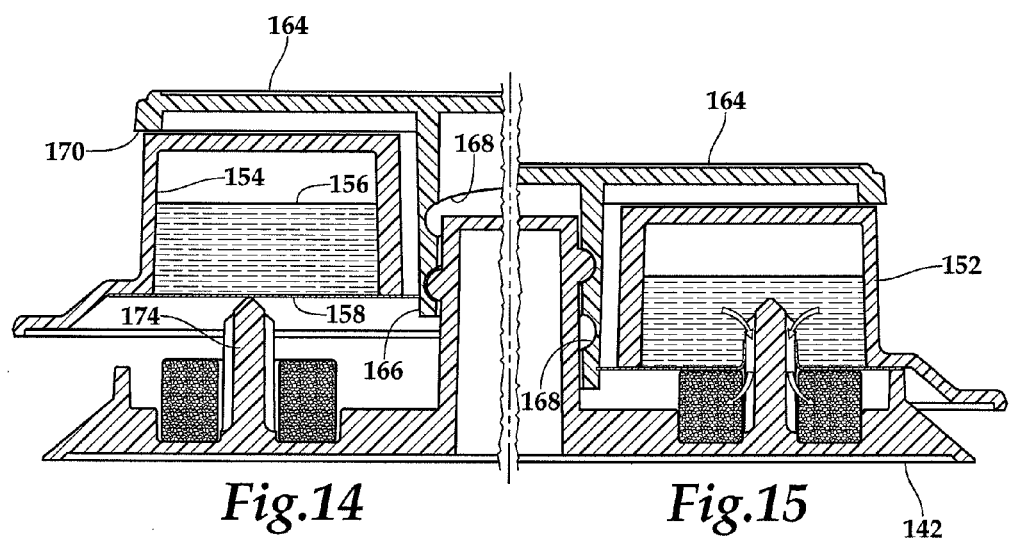

ANT BAIT DISPENSER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to containers for dispensing toxic insect bait liquids.

Certain insect pests will exhibit variations in dietary preferences, making it difficult to address particular insect infestations with a single toxic bait. When this is the case, for example with ants, bait dispensers may be configured to simultaneously dispense more than one variety of bait. Oftentimes the bait is presented in liquid form, yet it is desirable that a bait dispenser be capable of an extended term of use between the times of replenishment. It is therefore desirable that a dispenser of liquid bait offer mechanisms for making the toxic liquid bait readily available to the targeted insect species while retarding as much as possible the evaporation of the liquid.

SUMMARY OF THE INVENTION

The dispenser for liquid toxic insect baits of this invention has a top with foil-sealed liquid bait compartments. The top is mounted on a base for axial motion towards the base on a shaft. The base has protruding posts disposed beneath each sealed bait compartment. A tear-off strip on the base keeps the foil-seal sufficiently above the posts to prevent puncturing of the seal. Once the tear-off strip is removed, the top can be advanced towards the base to simultaneously puncture the foil seal on all the compartments, thereby permitting the toxic bait fluid to flow along the posts and be retained by a sponge-like liquid retaining member, formed, for example, of hydrophillic open cell polyurethane foam. Projecting flanges of the container shield the liquid retaining members from direct sunlight and breezes, thereby retarding the process of evaporation and extending the useful life of a particular dispenser. The top may alternatively be hinged to the base. Or, the top may be mounted around a threaded post on the base, and positioned beneath a cap which is engaged the threaded post such that rotation of the cap drives the top into engagement with the base posts.

It is an object of the present invention to provide a container for the dispensing of liquid insect toxic baits which may be conveniently switched from a storage to an in-use configuration.

It is a further object of the present invention to provide a container for the dispensing of liquid insect toxic baits which, while making the baits readily available to the targeted insects, retards the evaporation of the dispensed liquids.

Further objects, features and advantages of the invention will be apparent from the following detailed description when taken in conjunction with the accompanying drawings.

BRIEF DESCRIPTION OF THE DRAWINGS

FIG. 1 is an exploded isometric view of the ant bait dispenser of this invention.

FIG. 4 is a fragmentary cross-sectional view of the dispenser of FIG. 2 in the shipping configuration taken along section line 4-4.

FIG. 5 is a fragmentary cross-sectional view of the dispenser of FIG. 4 in the dispensing configuration.

FIG. 6 is a fragmentary cross-sectional view of the dispenser of FIG. 2 in the shipping configuration taken along section line 6-6.

FIG. 7 is a fragmentary cross-sectional view of the dispenser of FIG. 6 in the dispensing configuration.

FIG. 13 is an exploded isometric view of the dispenser of FIG. 12.

FIG. 14 is a cross-sectional view of the dispenser of FIG. 12, taken along section line 14-14, showing the dispenser after removal of the tear strip but prior to being moved into the in-use configuration.

FIG. 15 is a cross-sectional view of the dispenser of FIG. 12 in which the cap has been screwed down to activate the dispenser.

DESCRIPTION OF THE PREFERRED EMBODIMENTS

Figure 2:
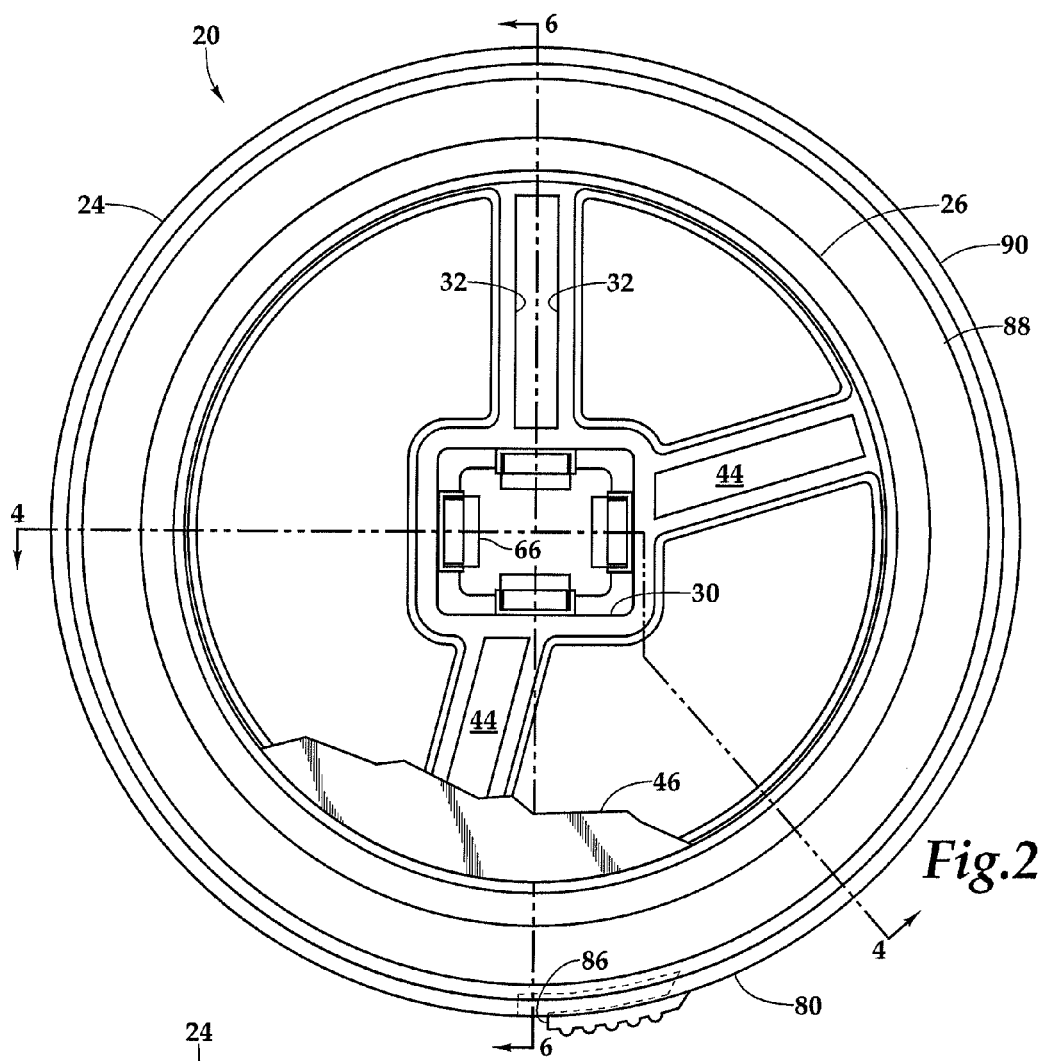
FIG. 2 is a top plan view of the dispenser of FIG. 1 in the shipping configuration, with the top label partially broken away.

Referring more particularly to FIGS. 1-15, wherein like numbers indicate similar parts, a toxic insect bait dispenser 20 shown in FIGS. 1-7 has a base 22 with a top 24 which is retained on the base. The base and top 24 may be injection molded plastic parts, formed, for example, of polypropylene. The top has a frustoconical exterior side wall 26. An upper wall 28 extends from the side wall to a central shaft 30 which opens upwardly and downwardly. Double interior walls 32 extend from the side wall 26 to the shaft 30 and divide the top into three compartments 34 which may be filled with insect toxic bait 36, as shown in FIGS. 4-7. The toxic bait within each compartment 34 may have a different composition, in order to target, for example, different varieties of ants, or the same toxic bait may be retained within all the compartments.

Figure 3:
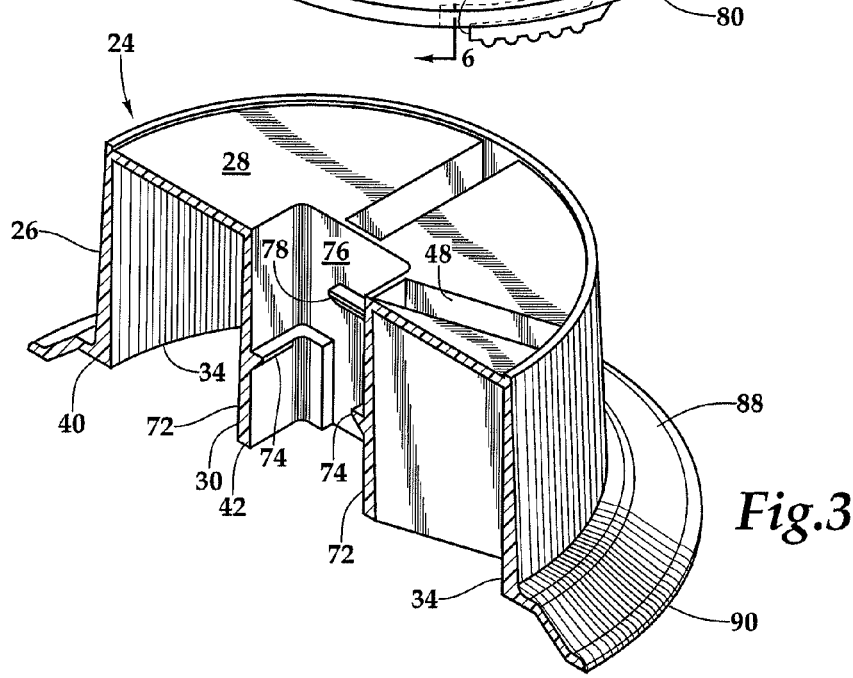
FIG. 3 is an isometric cross-sectional view of the top of the dispenser of FIG. 2.

The fluid toxic bait 36 is retained within the compartments 34 by a foil disk barrier 38, shown in FIG. 1. The foil disk 38 is adhered to the top 24 and is sealed around the lower perimeter of each compartment 34 as it underlies an annular peripheral region 40 of the top, as shown in FIG. 3. It is sealed to the top on the inward sides of the compartments along the underside 42 of the shaft 30 and at the connecting wall 44 between the double interior walls 32 which divide the compartments, as shown in FIG. 2. The foil disk 38 is comprised of multiple layers. The lower layer is aluminum, with polymeric barrier and sealant layers above the aluminum layer. The disk 38 forms a liquid tight barrier beneath the fluid toxic baits within the top 24, and thus allows the toxic bait to be stored for extended periods without evaporation.

As shown in FIG. 1, a disk-shaped label 46 is adhered to the upper wall 28 of the top 24 and may be provided with indicia indicating the purpose and operation of the container. The label 46 extends over the central shaft 30 and bridges the gaps 48 between the double interior walls 32.

The base 22 has a circular bottom wall 50 with depressed pockets 52 therein. Centered within each pocket 52 is an upwardly protruding post 54. A toxic bait compartment 34 is positioned above each post 54. Each post 54 extends axially and terminates in a conical tip 56. Multiple axially extending grooves 58 are formed in each post 54. As shown in FIG. 5, the grooves extend upwardly from a pocket 52 to the tip 56. Because there are multiple fluid compartments, each post is positioned radially outwardly from the central axis of the top and the base.

An annular liquid retaining member 60 is disposed within each base pocket 52 to surround the posts 54. The liquid retaining members 60 may be comprised of open cell hydrophillic polyurethane foam or any appropriate material which will hold and retain the liquid toxic bait. Like a sponge, the members 60 receive toxic bait discharged from the top compartments and make it available to insects for feeding. The members 60 prevent the uninterrupted flow of liquid from the compartments, and serve to limit the rate of evaporation of the fluid toxic bait. The members 60 should be fabricated of a material to cooperate with the toxic bait selected and the size of the toxic bait compartments such that the container can operate effectively in dispensing toxic bait to targeted insects for about two weeks. Each liquid retaining member 60 has a central hole 62 through which a post 54 extends, retaining the member in proximity to the post.

As shown in FIGS. 4-7, the container 20 has two principal configurations. In a first configuration which will be employed during shipping and storage, and shown in FIGS. 2, 4, and 6, the foil barrier 38 is spaced above the posts 54 and the foil disk barrier is intact, thereby retaining the liquid toxic baits within the top compartments 34. In this configuration the container may be stored with toxic bait for extended periods of time. In a second configuration which will be employed when the container is in use for dispensing insect toxic bait, as shown in FIGS. 5 and 7, the top 24 is pressed down on the base so the foil barrier 38 is pierced by the posts 54 allowing the dispensing of the toxic bait from the compartments 34. Wicking is a capillary function whereby surface tension draws liquid along small spaces such as are produced by a fabric or rope, a capillary tube, or foam. When the upwardly protruding post 54 enters the compartment 34 which serves as a toxic bait reservoir, it displaces a corresponding volume of liquid which moves down the grooves 58 bringing liquid into contact with the liquid retaining member 60 which is compressed against the foil seal, as best shown in FIGS. 5 and 7. The liquid retaining member 60 may act as a capillary device pulling liquid from the container so long as it is in contact with the liquid in the container. The annular liquid retaining member 60 may be a polyurethane foam or other material that will freely absorb and hold water, wet out, and release fluid, such as a foam that is facilitated by a fine pore material or double cell material that absorbs and conveys fluids. It will be observed that liquid in the compartment does not pour out, but merely engages the liquid retaining members and is wicked out. When in its dispensing condition, a small gap is defined between the base peripheral skirt 82 and the top peripheral skirt 88 which allows the entrance of insects. This gap defines a passageway for entrance of insects to the fluid retaining members, but the passageway restricts direct air flows across the fluid retaining members and helps to retard evaporation of dispensed fluid. The protruding top skirt shades the interior as well as restricting air flows across the fluid retaining members, as do the base rim walls 94. Reduced evaporation extends the useful life of the dispensing container before it needs to be replaced.

The container 20 is constructed to prevent inadvertent transition between the shipping and storage configuration and the in-use configuration, as well as to prevent the separation of the top from the base and to prevent the top from being pulled away from the base once dispensing of toxic bait has been activated. As shown in FIG. 1, the base has a projection 64 which projects upwardly from the base 22 to a height greater than the posts 54 and which extends within the top shaft 30. The base projection 64 is terminated by four similar prongs 66. Each prong 66 has an upper wedge 68 which extends outwardly from a flange 70. The base projection 64 is spaced radially inwardly from the posts and is positioned between the posts. The base projection 64 cooperates with the top and has structure discussed below which restricts the separation of the top from the base in two different positions. By being located between the posts, this structure leaves the exterior perimeter of the device 20 free of such structure, facilitating the tear-away strip 80 discussed below.

As shown in FIG. 3, the top shaft 30 has two first shaft walls 72 which are substantially parallel to one another. A first ledge 74 projects inwardly from one of the first shaft walls 72, and another first ledge projects inwardly from the other of the first shaft walls as shown in FIGS. 4 and 5. As shown in FIGS. 6 and 7, the top shaft 30 has two second shaft walls 76 which extend substantially perpendicular to the first shaft walls 72, and which extend between and connect the first shaft walls. Second ledges 78 project inwardly from the second shaft walls 76. The first ledges 74 are positioned closer to the underside 42 of the shaft in the top than the second ledges 78.

When the container 20 is first assembled, it is in the first configuration suitable for storage or shipment. To reach this configuration, the top shaft is aligned with the base projection, and the top is pressed downwardly. The first ledges 74 have inclined surfaces on their undersides, as shown in FIGS. 4 and 5, such that the base projection prongs 66 deflect inwardly as the top is pressed downwardly. When the two prongs 66 clear the first ledges they return to their original positions with the prong wedges 68 engaged above the first ledges 74 in such a fashion that the top may not be moved upwardly away from the base. In this storage and shipping configuration, there is not direct access to the foil barrier, and hence the barrier is protected from being punctured and spilling the fluid within the compartments 34.

While the separation of the top from the base is prevented by the engagement of the prongs with the first ledges, the movement of the top towards the base into the dispensing configuration is restricted by a substantially cylindrical tear strip 80, best shown in FIG. 1, which is connected to a frustoconical peripheral skirt 82 which extends downwardly and outwardly from the base bottom wall 50. As shown in FIGS. 4 and 6, the tear strip is joined along its lower margin to the peripheral skirt 82 by a region of weakened material 84, which is to say the plastic is thinner in this region. The tear strip 80 does not completely encircle the base, but has a free end 86 which is engagable by a user such that it may be removed by a user engaging the free end and pulling on the tear strip to thereby separate the tear strip from the base. It should be noted that other mechanisms of forming the region of weakened material may be used, for example perforations. The free end may be provided with a region of increased friction, for example protruding ridges, to better facilitate gripping and engagement by a user.

As shown in FIG. 4, the top has a peripheral skirt 88 which extends downwardly and outwardly from the top side wall 26. The skirt 88 terminates in a flange 90 which engages with an upper peripheral edge 92 of the tear strip 80 which restricts the displacement of the top towards the base in the shipping and storage configuration.

When the container is ready to be deployed, the user engages the free end of the tear strip 80, and peels the tear strip away from the base at the region of weakened material 84. Once the tear strip 80 is removed from the base, there is no longer an obstacle to the top being moved more closely to the base, and the top is then free to be advanced to the dispensing position to activate dispensing of insect toxic bait from the container. As shown in FIGS. 6 and 7, when the top is pressed downwardly, the second ledges 78 ride over the wedges on two opposed prongs 66 extending from the base projection. When the prong wedges 68 are above the second ledges 78, the top is retained in its lowered position where it cannot be separated from the base or disengaged from the annular liquid retaining members 60.

As shown in FIGS. 5 and 7, when the top 24 is in its lowered position, the posts 54 pierce the barrier 38 in each toxic bait compartment 34. The fluid within each compartment then proceeds through the post grooves to communicate with the liquid retaining members 60. The base has partial upwardly extending rim walls 94 which engage the underside of the top, and limit the downward travel of the top towards the base. The rim walls 94, as they engage the top 24, help to support the weight of the top on the base. Shallow rim walls 96 extend between the rim walls 94, and shallow walls 98 surround other openings in the base to capture small quantities of liquid on the base. Insects such as ants may enter the container 20 above the base skirt and gain access to the fluid retention members.

As shown in FIG. 1, the liquid retaining members 60 fit within depressed pockets 52 in the base 22. In FIG. 1 the retaining members 60 and pockets 52 are shown with uniform vertical heights although the vertical dimensions could be varied. One of the liquid retaining members 60 and pockets 52 is shown in cross-section only in FIG. 5 wherein the liquid retaining member is slightly compressed reducing its vertical height beneath the foil 38 which seals one of the compartments 32. This compression assures a good seal between the liquid retaining members 60 and the foil barrier 38 so that when saturated the liquid retaining member prevents air from entering the compartment 32, and, when sufficient liquid is evaporated or removed by targeted insects, air may be allowed to move through the liquid retaining member and enter the compartment through the perforation in the foil barrier 38 along the grooves 58 in the posts 56. Entry of air into the compartment 32 allows additional liquid to move down the grooves 58, thus saturating the liquid retaining member 60.

Figure 11:
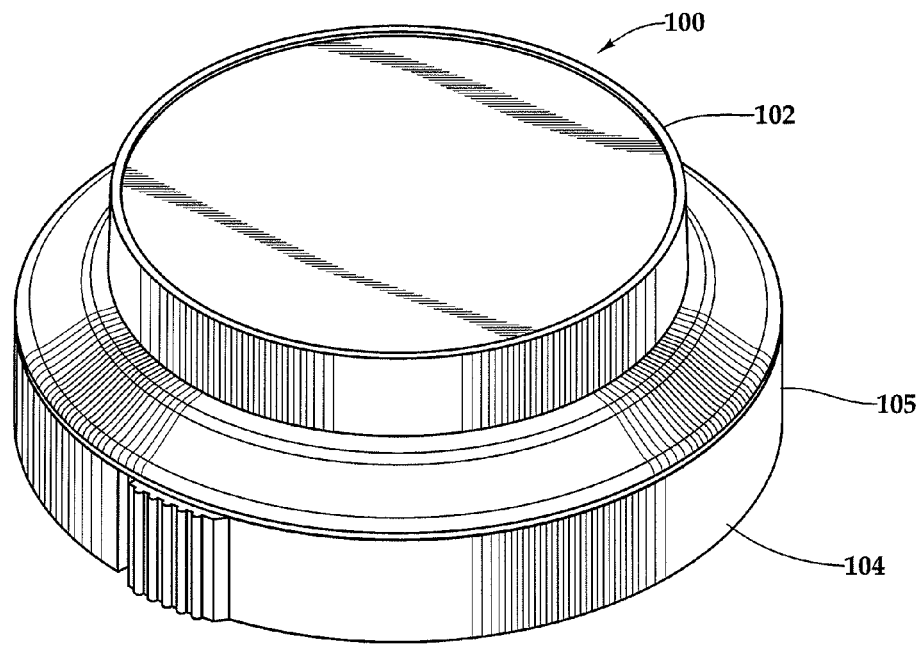
FIG. 11 is an isometric view of an alternative embodiment low profile insect bait dispenser of this invention.

As shown in FIG. 11, an alternative embodiment dispenser 100 may be formed with a low-profile to have a top 102 with a lower capacity mounted with respect to a base 104. The base may have a tear strip 105.

Figure 8:
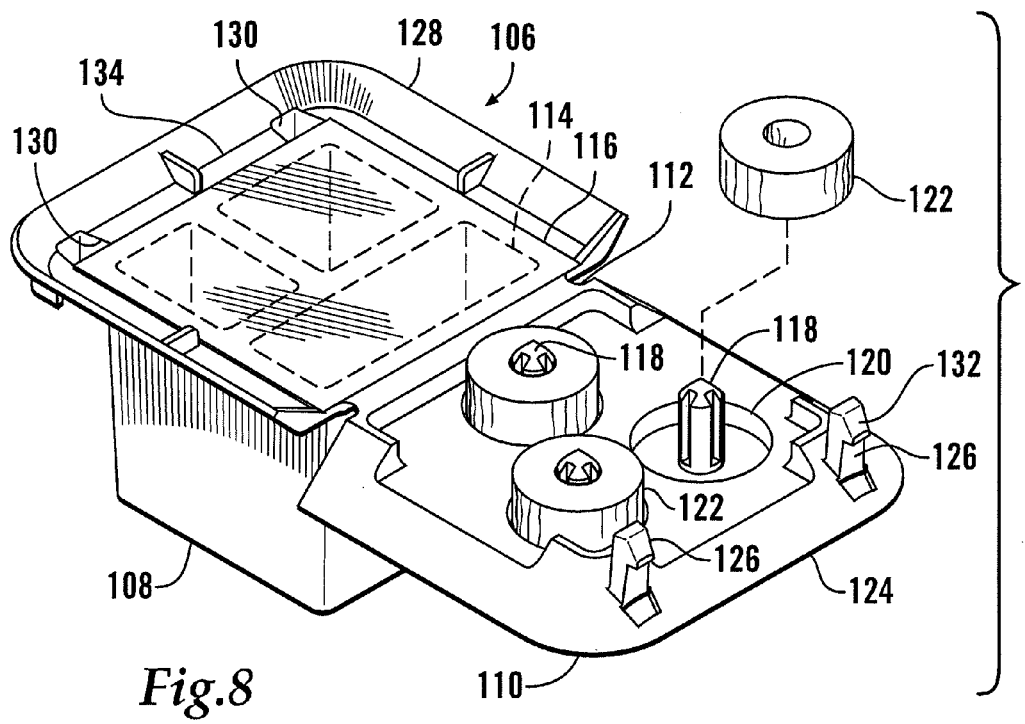
FIG. 8 is an exploded isometric view of an alternative embodiment insect bait dispenser of this invention, having a top which is hinged to a base, showing the dispenser in a shipping and storage configuration.
Figure 9:
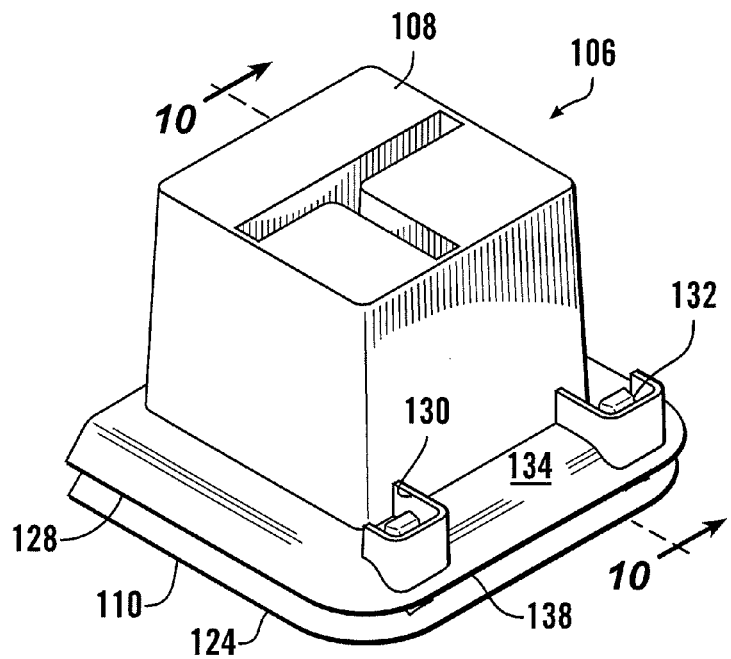
FIG. 9 is an isometric view of the dispenser of FIG. 8 in an in-use configuration.
Figure 10:
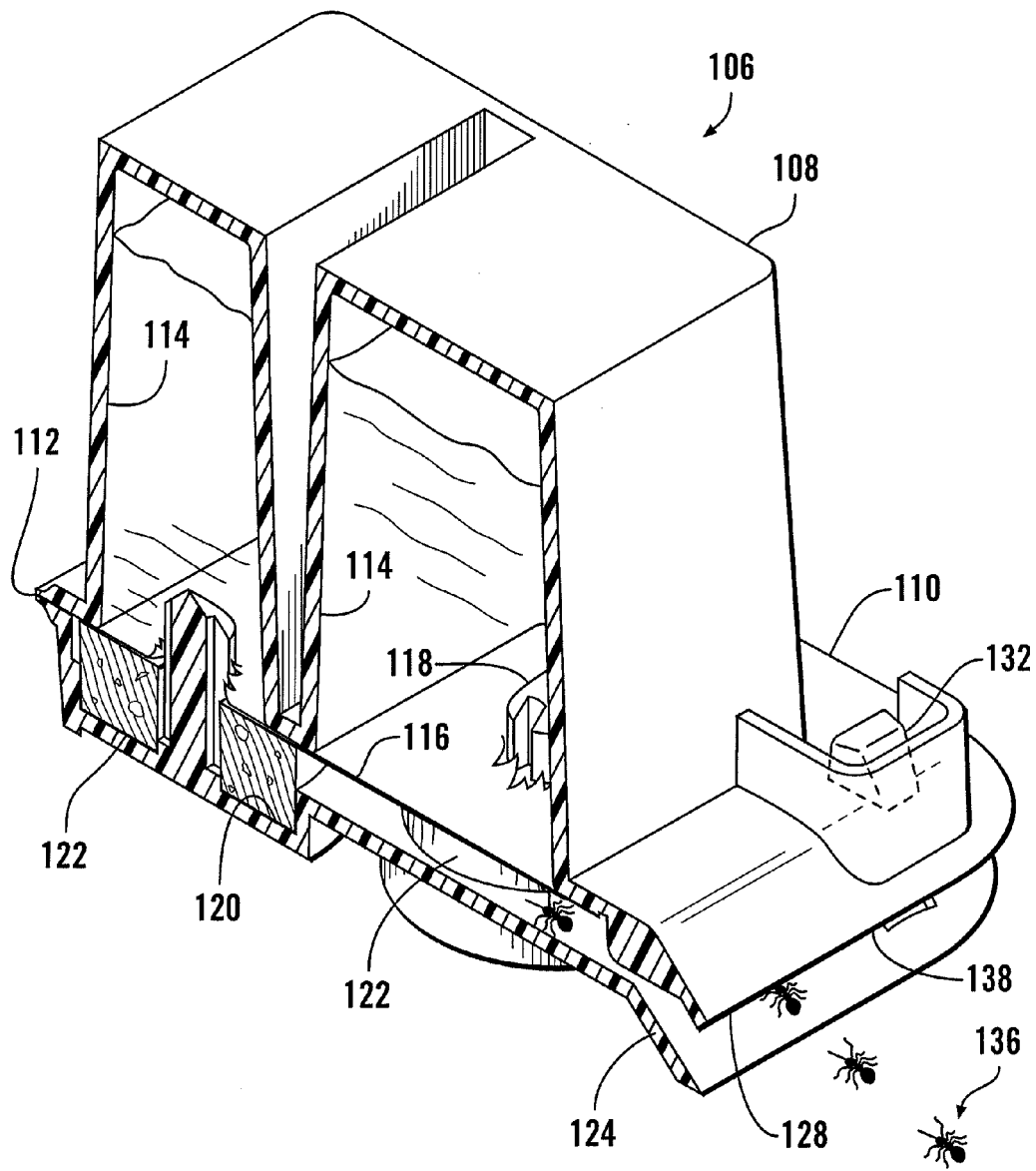
FIG. 10 is a cross-sectional view of the dispenser of FIG. 9 taken along section line 10-10.

Another alternative embodiment dispenser 106, shown in FIGS. 8-10, has a top 108 which is integrally formed as an injection molded plastic part with a base 110. The Top 108 is connected to the base 110 by a living hinge 112. The top 108 has three compartments 114 which are sealed with a foil barrier 116. Three posts 118 extend upwardly from pockets 120 in the base 110. Annular liquid retaining members 122 are received within the pockets 120, each encircling one of the posts 118. The base 110 has a downwardly and outwardly extending skirt 124. Two prongs 126 extend upwardly from the skirt 124 on a side of the skirt 124 which is opposite the living hinge 112. The top 108 has a downwardly and outwardly extending skirt 128, into which is formed two channels 130 configured to receive the wedges 132 of the prongs 126. Each wedge 132, as shown in FIG. 10, engages against an upper surface of a flange 134 which extends inwardly from the top skirt 128.

The dispenser 106 is stored and shipped with the base 110 connected to the top 108 about the hinge 112, with the base substantially parallel to the plane of the barrier 116. When it is desired to place the dispenser 106 into service to attract and poison insects such as ants 136, the top 108 is pivoted about the hinge to overlie the base 110. When pivoted into the in-use configuration, the barrier 116 underlying the compartments 114 is pierced by the posts 118, and the resilient liquid retaining members 122 are compressed against the barrier. The toxic ant bait then escapes from the top compartments 114 to the liquid retaining members 122. Insects can then enter the dispenser through gap 138 defined between the top skirt 128 and the base skirt 124.

Figure 12:
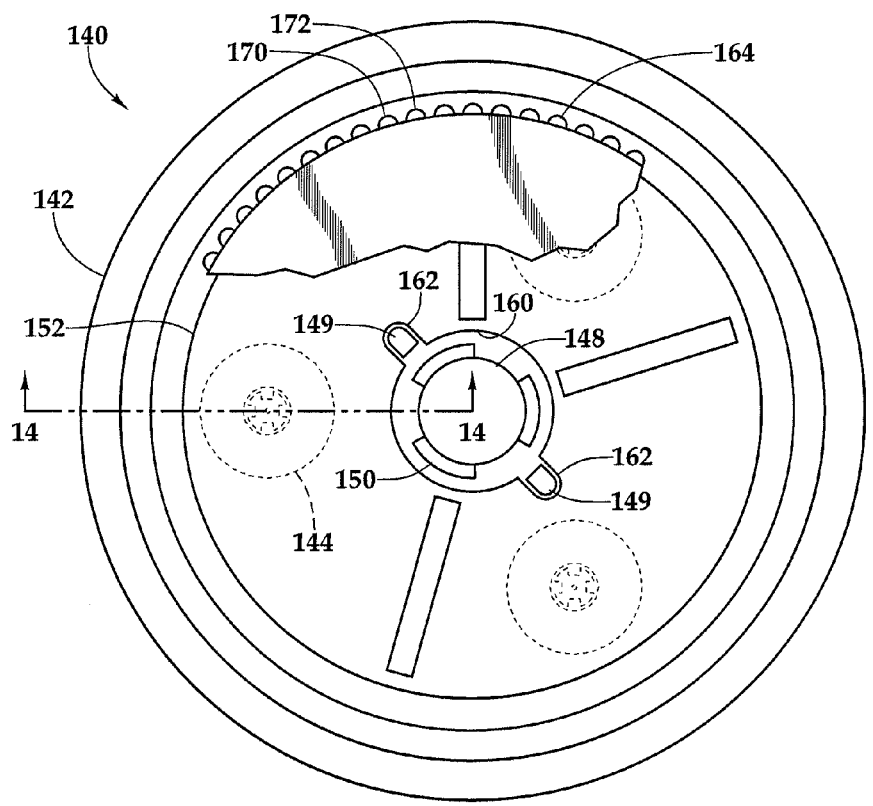
FIG. 12 is a top plan view, partially broken away in section, of another alternative embodiment dispenser of this invention having a screw-down cap prior to being activated.

Another alternative embodiment dispenser 140 is shown in FIGS. 12-14. The dispenser 140 may have a tear strip as in the above embodiments, but is shown in the figures after removal of any such strip. The dispenser 140 has a base 142 with three liquid-retaining members 144 retained within base pockets 146. The base 142 has a central post 148 with protruding spiral threads 150. As shown in FIG. 13, the threads need not be continuous and may be interrupted. Two stub shafts 149 extend from the base 142 on opposite sides of the post 148. A top 152 has three compartments 154 for the retention of toxic fluid insect bait 156. The fluid bait 156 is retained within the compartments 154 by a foil barrier 158. The top 152 has a central channel 160 through which the central post 148 extends. The channel 160 has two radially extending lobes 162 which capture the base stub shafts 149. The top 152 is thus retained on the base 142 and restrained from rotating yet free to move vertically with respect to the base.

As shown in FIGS. 14 and 15, a cap 164 overlies the top 152 and has a downwardly extending shaft 166 with an internal thread 168 which engages the protruding spiral threads 150 of the base central post 148. The cap 164 has a downwardly facing outer rim 170 which engages with the top 152. The exterior perimeter of the cap 164 may be provided with ribs 172 to promote friction and facilitate engagement of the cap and rotation thereof by a user. When the cap 164 is rotated, the top 152 is urged downwardly to drive the base posts 174 through the barrier 158 introducing the fluid bait into the liquid retaining members 144.

It is understood that the invention is not limited to the particular construction and arrangement of parts herein illustrated and described, but embraces all such modified forms thereof as come within the scope of the following claims.

We claim:
1. A container for dispensing insect toxic bait comprising:
a top having a side wall and at least one interior wall dividing the top into a plurality of compartments for the reception of insect toxic bait therein;
a barrier affixed to the top forming a seal beneath the plurality of compartments to form sealed volumes for retaining insect toxic bait therein;
a base positioned beneath the top and having a plurality of posts projecting therefrom, wherein each of the plurality of compartments corresponds to one of the plurality of base posts;

a plurality of liquid retaining members supported on the base, wherein a respective one of the plurality of liquid retaining members is positioned in proximity to each post to surround each of said posts, the barrier being located between the plurality of compartments and the plurality of liquid retaining members; and portions of the base which engage with the top to retain the top in two alternative positions, a first position in which the barrier is spaced above the posts, and a second dispensing position in which the liquid retaining members engage with and are compressed against the barrier while the barrier is pierced by the posts which extend upwardly through the barrier to extend above the barrier to allow the escape of the contents of the compartment into the liquid retaining members for dispensing to a targeted insect, in the second position the liquid retaining members being exposed for engagement by the targeted insect.

2. The container of claim 1 wherein the plurality of liquid retaining members are comprised of open cell foam material.

3. The container of claim 1 wherein the barrier is formed of a metallic foil material.

4. The container of claim 1 wherein each post has an upwardly extending axis, and wherein portions of each post define at least one axially extending groove, the at least one groove communicating with an associated liquid retaining member of the plurality of liquid retaining members.

5. The container of claim 1 further comprising:

portions of the top which define a downwardly opening top shaft;

a first ledge projecting from the top shaft;

a second ledge projecting from the top shaft; and a base projection which projects upwardly from the base and extends within the top shaft, the base projection having thereon a first prong which engages above the first ledge in the first position when the barrier is spaced above the posts, and a second prong which engages above the second ledge in the second position in which the barrier is pierced by the posts, wherein the prongs serve to restrict the separation of the top from the base in both the first position and the second position.

6. The container of claim 1 further comprising a tear strip connected to the base and extending upwardly therefrom to engage the top in the first position to restrict the top from advancement into the second position, the tear strip having a free end which is engagable by a user, wherein portions of the tear strip are connected to the base by a region of weakened material, such that the tear strip may be removed by a user engaging the free end and pulling on the tear strip to thereby separate the tear strip from the base and permit the top to be advanced from the first position to the second position to activate dispensing of said insect toxic bait from the container.

7. The container of claim 1 wherein the base has a downwardly and outwardly projecting skirt, and the top has a skirt which extends downwardly and outwardly above the base skirt to define a passageway for entrance of insects to the fluid retaining members, the passageway restricting direct air flows across the fluid retaining members.

8. The container of claim 1 wherein the top is connected to the base by a hinge for pivoting between the first position and the second position.

9. The container of claim 1 further comprising a cap which overlies and engages the top and which has portions which threadedly engage with the base, such that rotation of the cap advances the top from the first position to the second position.

10. The container of claim 5 wherein the downwardly opening top shaft comprises:

two first shaft walls substantially parallel to one another, wherein the first ledge projects inwardly from one of the first shaft walls; and another first ledge projects inwardly from the other of the first shaft walls; and two second shaft walls substantially perpendicular to the first shaft walls, wherein the second ledge projects inwardly from one of the second shaft walls, and another second ledge projects inwardly from the other of the second shaft walls, and wherein the first ledges are positioned closer to the base than the second ledges.

11. A container for dispensing insect toxic bait comprising:

a top having a side wall and a downwardly opening shaft, the top having portions which define a plurality of downwardly opening fluid compartments for the reception of insect toxic bait therein;

a first ledge projecting inwardly from the top shaft;

a second ledge projecting inwardly from the top shaft, and spaced upwardly from the first ledge;

a barrier affixed to the top beneath the fluid compartments for retaining said insect toxic bait therein;

a base positioned beneath the top and having a plurality of posts projecting upwardly therefrom, a respective post of said plurality of posts positioned beneath each of the fluid compartments; and a base projection which projects upwardly from the base above a height of the posts and is positioned between two posts of said plurality of posts, the base projection extending within the top shaft, the base projection having thereon a first prong which engages above the first ledge in a first position when the barrier is spaced above the posts, and a second prong which engages above the second ledge in a second position in which the barrier is pierced by the posts allowing the dispensing of said insect toxic bait from the fluid compartments, wherein the prongs serve to restrict the separation of the top from the base.

12. The container of claim 11 wherein the top downwardly opening shaft has an underside, and the shaft comprises:

two first shaft walls substantially parallel to one another, wherein the first ledge projects inwardly from one of the first shaft walls, and another first ledge projects inwardly from the other of the first shaft walls; and two second shaft walls substantially perpendicular to the first shaft walls, wherein the second ledge projects inwardly from one of the second shaft walls, and another second ledge projects inwardly from the other of the second shaft walls, and wherein the first ledges are positioned closer to the shaft underside than the second ledges.

13. The container of claim 11 further comprising a tear strip connected to the base and extending upwardly therefrom to engage the top in the first position to restrict the top from advancement into the second position, the tear strip having a free end which is engagable by a user, wherein portions of the tear strip are connected to the base by a region of weakened material, such that the tear strip may be removed by a user engaging the free end and pulling on the tear strip to thereby separate the tear strip from the base and permit the top to be advanced from the first position to the second position to activate dispensing of said insect toxic bait from the container.

14. The container of claim 12 further comprising:

a liquid retaining member supported on the base in proximity to each post to receive liquid dispensed from each compartment and make it available for access by insects.

15. The container of claim 14 wherein the liquid retaining member is comprised of open cell foam material.

16. A container for dispensing insect toxic bait comprising:
- a top having portions which define a plurality of downwardly opening fluid compartments for the reception of insect toxic bait therein;
- a barrier affixed to the top beneath each of the fluid compartments for retaining insect toxic bait therein;
- a base positioned beneath the top and having a plurality of protruding posts;
- portions of the base which extend from the base to engage portions of the top to thereby restrict the separation of the top from the base, the top being movable between two positions, a first position where the barrier is spaced from the base posts, and a second position in which the barrier is pierced by the base posts allowing the dispensing of said insect toxic bait from the fluid compartments; and
- a tear strip connected to the base and extending upwardly therefrom to engage the top in the first position to restrict the top from advancement into the second position, the tear strip having a free end which is engagable by a user, wherein portions of the tear strip are connected to the base by a region of weakened material, such that the tear strip may be removed by a user engaging the free end and pulling on the tear strip to thereby separate the tear strip from the base and permit the top to be advanced from the first position to the second position to activate dispensing of said insect toxic bait from the container.

17. The container of claim 16 wherein the base has a peripheral skirt, and wherein the tear strip comprises a substantially cylindrical strip which extends upwardly from the base skirt.

18. The container of claim 16 wherein the base has a peripheral skirt, and wherein the top has a peripheral skirt which extends outwardly from the portions defining the fluid compartments, the skirt terminating in a flange, and wherein the top flange engages with an upper peripheral edge of the tear strip which restricts the displacement of the top towards the base in the first position.

19. The container of claim 16 wherein the base has a downwardly and outwardly projecting skirt, and the top has a skirt which extends downwardly and outwardly above the base skirt to define a passageway for entrance of insects to a fluid retaining member in communication with the posts, the passageway restricting direct air flows across the fluid retaining member.

20. The container of claim 16 further comprising a cap which overlies and engages the top and which has portions which threadedly engage with the base, such that rotation of the cap advances the top from the first position to the second position.

* * * * *